(No Model.)

L. H. NASH.
FLUID METER.

No. 280,322. Patented June 26, 1883.

Witnesses:
Edmond Brodhag
Howell Bartle

Inventor:
pro Lewis Hallock Nash,
Johnson & Johnson
Attys

UNITED STATES PATENT OFFICE.

LEWIS H. NASH, OF BROOKLYN, ASSIGNOR TO THE NATIONAL METER COMPANY, OF NEW YORK, N. Y.

FLUID-METER.

SPECIFICATION forming part of Letters Patent No. 280,322, dated June 26, 1883.

Application filed March 18, 1882. (No model.)

*To all whom it may concern:*

Be it known that I, LEWIS HALLOCK NASH, a citizen of the United States, residing at Brooklyn, county of Kings, State of New York, have invented new and useful Improvements in Fluid-Meters, of which the following is a specification.

This invention relates to registering the measure of liquid flowing through the meter by the agency of a magnetic connection between the pistons or moving parts of the meter and the registering device.

The object of my improvements in meters of this class is to perfect means for making this magnetic connection of the registering-gear with the rotary pistons or moving parts, so as to render the revolution of the register driver or armature synchronous with the revolution of the magnet driven by said pistons or moving parts, and thereby obtain an exact registration of the measure of water as it passes through the meter.

The improvements in the construction of fluid-meters of this class shall be hereinafter described and claimed.

Figure 1:
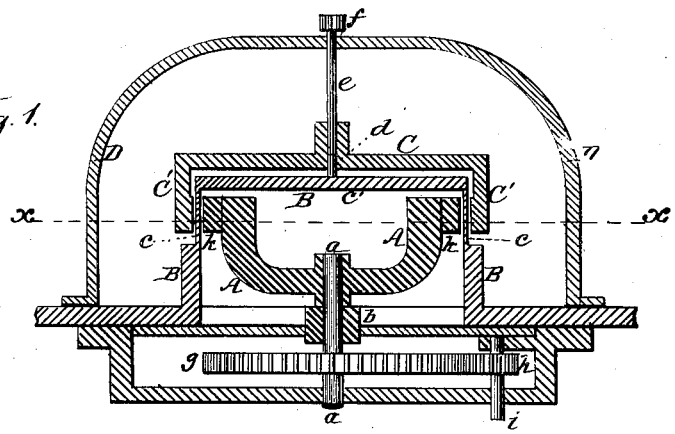
Figure 2:
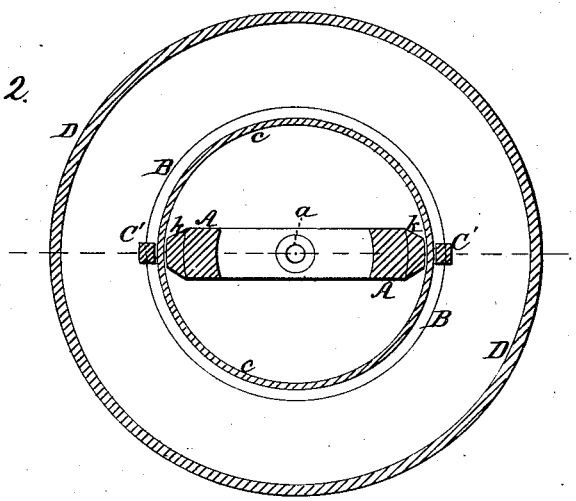
Figure 3:
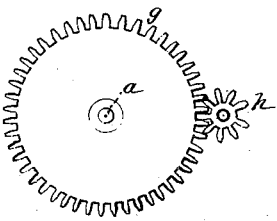

In the accompanying drawings, Figure 1 represents a vertical central section of a meter-case and shield embracing my invention; Fig. 2, a horizontal section of the same, taken on the line $x\,x$ of Fig. 1; and Fig. 3, a view of the speed-reducing gear.

The magnet A within the meter-case is preferably of the form shown, and is connected with the rotary pistons or moving parts of the meter (not shown) by a shaft, $a$, in any approved mechanical way, said shaft being properly journaled in a bearing, $b$, at its point of passage into the meter-case. In order that said magnet may turn with the revolution of the shaft, it is rigidly keyed to or fastened to it. The poles of this magnet approach, but do not touch, a plate, $c$, of brass or any material except iron or nickel, (as it must permit of the passage of magnetic force,) which forms the side portion of the cylindrical meter-case B, and separates said magnet from the armature of soft iron C, arranged outside of the meter-case and revoluble upon a pin, $d$, projecting from the top of the case B, upon which pin a shaft, $e$, is stepped, carrying the pinion $f$, connecting with the registering mechanism. The meter-case $Bc$ being made in the form of a cylinder, with a strong upper head, $c'$, a thin vertical wall portion, $c$, and a strong or stout lower cylindrical portion, B, I am enabled to turn the thin portion $c$ to the least thickness without making it so weak as to break under the pressure. The armature C is bent around the cylinder, so that the magnetic force acts at its ends, and thereby the force has a greater leverage in turning the armature, thus securing greater driving force. To the poles of the magnet I add pieces of soft iron $k\,k$, which, adhering to the poles, draw forth the force of the magnet into a small compass. They operate to concentrate the magnetic force, so that the power of a very large magnet may be made to act through small points of soft iron. The part B $c\,c'$ should preferably be a single brass casting.

An inclosing case or shield, D, of iron, surrounds the parts just described, to prevent outside magnetic forces from affecting the magnet. Should the meter-case be made of iron, it might itself perform such office; but the separating thin parts $c'\,c$ would necessarily be of brass or some other non-magnetic material, as before described.

The shaft $a$ is made to revolve slower than the pistons, or parts driven by the water, by means of speed-reducing gearing, consisting of a gear, $g$, on the shaft $a$, moved by a pinion, $h$, on the shaft $i$, connecting said shaft with the prime mover or rotary piston.

The shouldered form of casing B $c\,c'$ prevents dust or other matter from depositing at the point of contact of magnet and armature, as all such deposits will fall below, where they cannot interfere with the movement of the armature. The armature has drop angle ends $C'\,C'$, which move around the periphery of the thin portion $c$ of the casing, actuated by the force of the magnet inside the thin portion. Thus there is the least possible waste of the power of the magnet.

I am aware that the registering device of a fluid-meter has been controlled by the agency of a magnetic connection of the parts revolved by the direct action of the water and the registering device, in which a magnet revolves with the spindle of the part moved by the water closely below a thin copper plate, which divides the meter-case proper from the dial-chamber and from a magnet in said chamber carried by a separate driven spindle operating the registering device, so that the upper magnet, attracted by the lower one, follows its rotary movements, and thence operates the dial mechanism.

In my improved meter the poles of the driving-magnet are re-enforced by soft-iron pieces, for the purpose of concentrating the magnetic force at the lower ends of the depending arms of the armature. It is for this purpose that the part of the case opposite the re-enforcing soft-iron parts is made thin, and it is this combination of the driving-magnet provided with the re-enforcing soft-iron parts, the armature terminating in drop angle ends opposite the re-enforced parts, and the vertical thin dividing-wall that gives greater efficiency in the working and in the measurement.

I claim—

In a fluid-meter, the combination, with the driven magnet A, having its poles re-enforced with soft-iron pieces $k\,k$, of the case-top B, having the thin vertical wall part $c\,c$, and the armature C, having vertical angle ends overhanging said thin wall part, substantially as and for the purpose set forth.

In testimony whereof I have hereunto set my hand in the presence of two subscribing witnesses.

LEWIS H. NASH.

Witnesses:
WILLIAM M. BROWN,
HORACE R. NASH.